May 8, 1934. H. J. WOOCK 1,957,518
MACHINE FOR BACKING SHEET RUBBER
Filed March 20, 1933  3 Sheets-Sheet 1
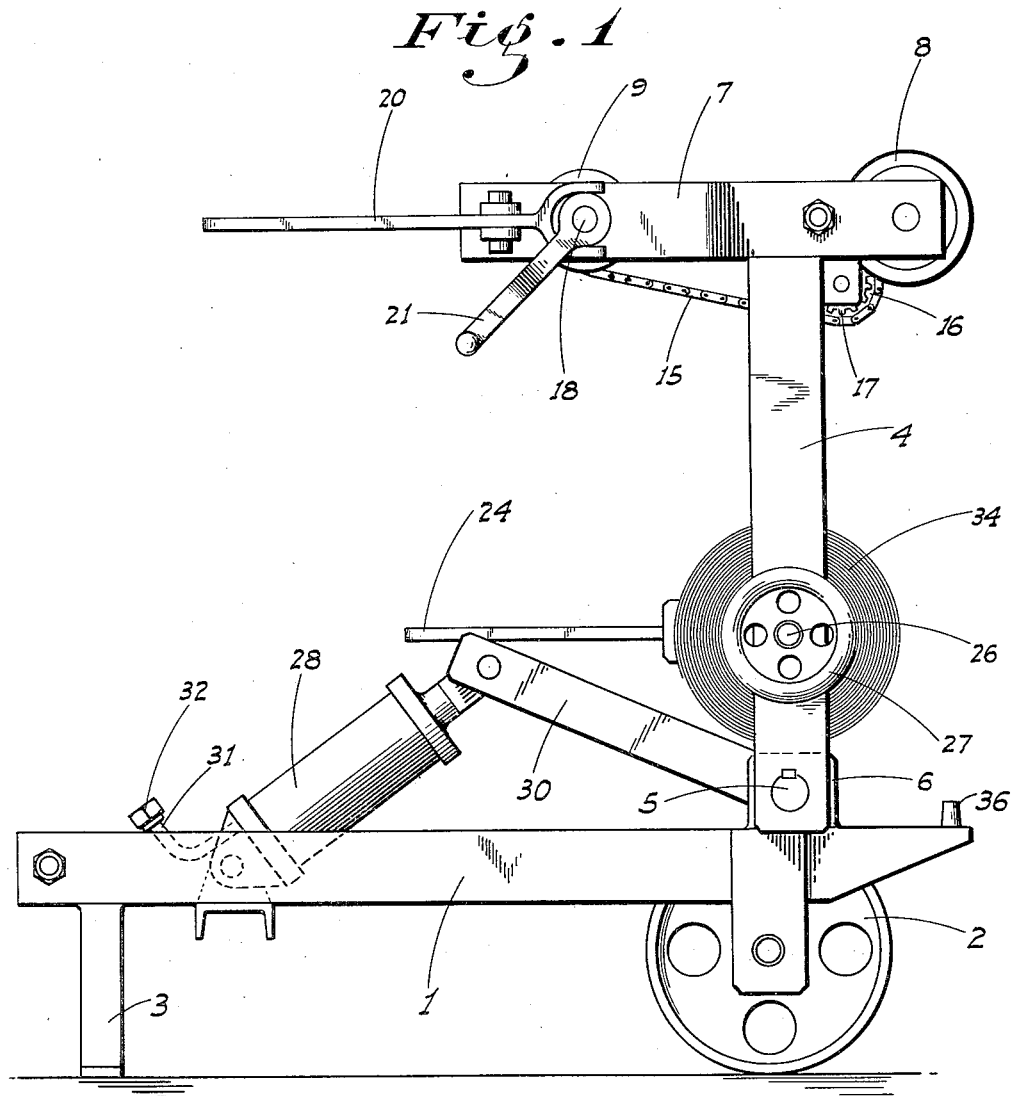
INVENTOR
*H. J. Woock*
BY 
ATTORNEY May 8, 1934. H. J. WOOCK 1,957,518
MACHINE FOR BACKING SHEET RUBBER
Filed March 20, 1933 3 Sheets-Sheet 2
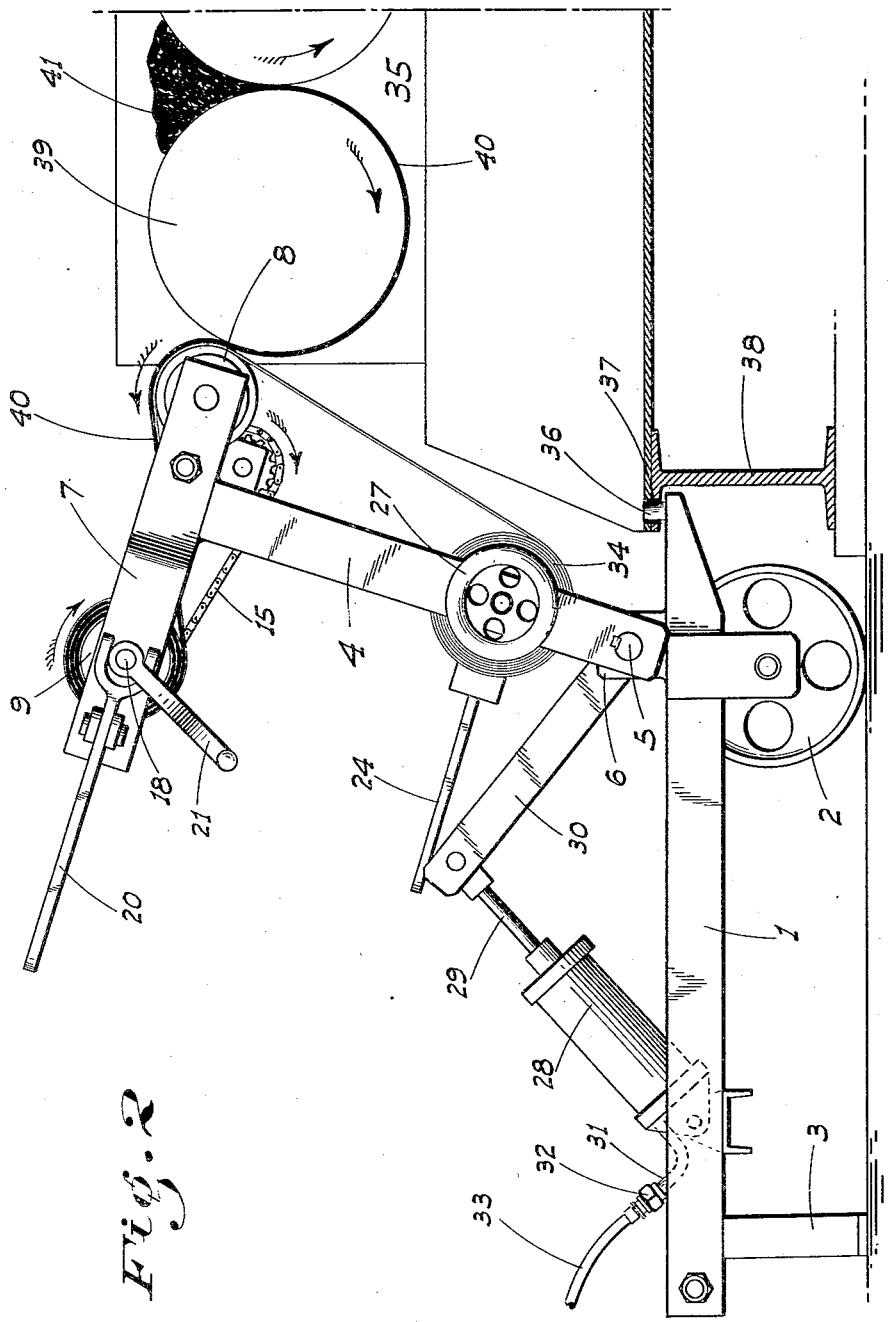
INVENTOR
*H. J. Woock*
BY
ATTORNEY

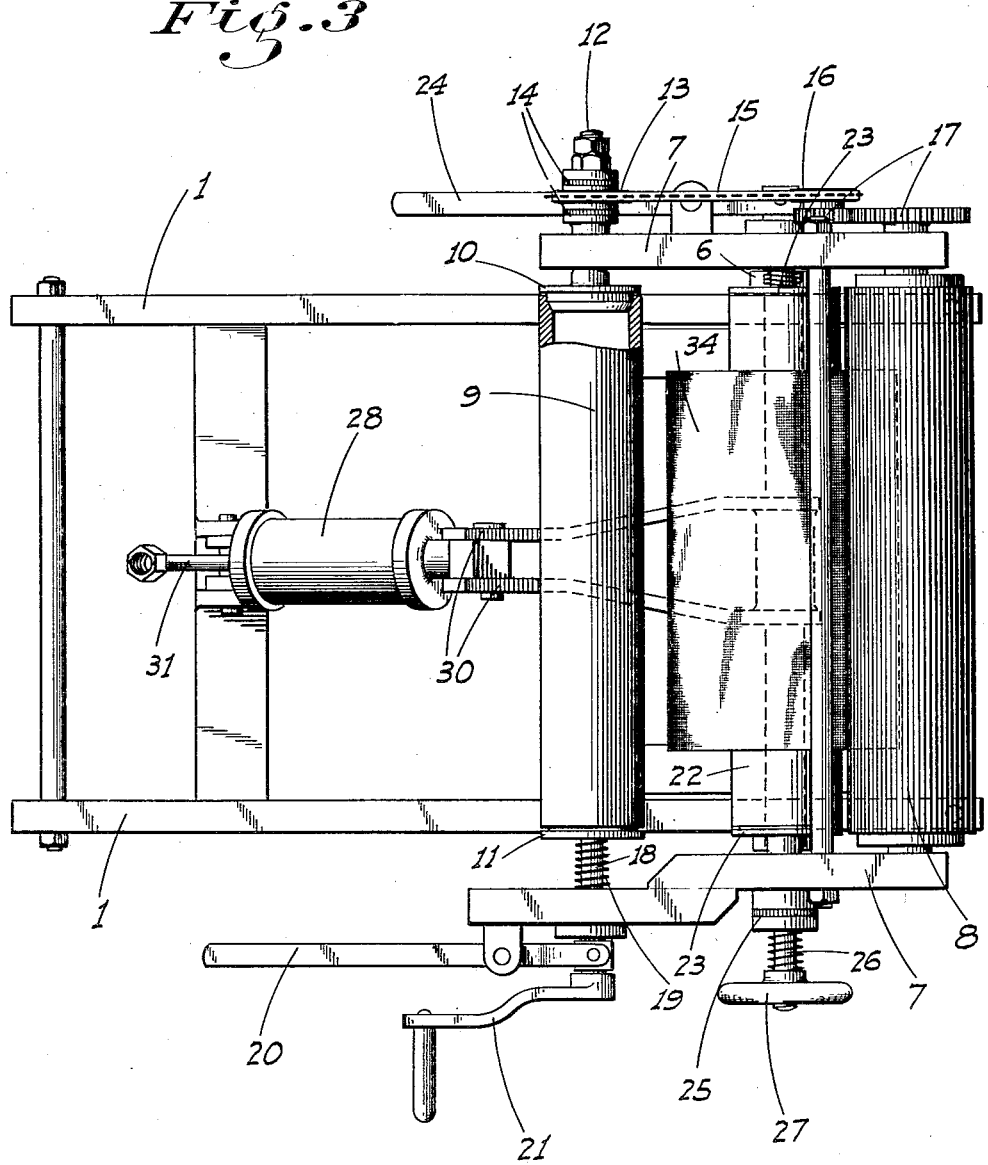

Patented May 8, 1934

1,957,518

UNITED STATES PATENT OFFICE 1,957,518

MACHINE FOR BACKING SHEET RUBBER

Herbert J. Woock, Lodi, Calif., assignor to Super Mold Corporation, Lodi, Calif., a corporation of Nevada Application March 20, 1933, Serial No. 661,685

13 Claims. (Cl. 242—55)

This invention relates to the tire industry and particularly to the backing of sheet rubber with holland or equivalent fabric in the preparation of what is commonly known as repair material. The present invention also particularly relates to the preparation of such material for application to liners to be inserted and vulcanized in tire carcasses, and for use in the machine to apply such rubber to the liners as set forth in my co-pending application for patent, Serial No. 661686, filed March 20, 1933.

At present the holland backed rubber is marketed in such a way that when used for liners there is considerable waste and it cannot be conveniently applied to liners on account of the fact that the exposed surface of the rubber, which is that which for convenience should be applied against the liner, soon develops a bloom from exposure to the air which interferes with the proper adhesion and vulcanizing of the rubber.

The principal object of my invention is to provide a simple and inexpensive form of machine operable by one man and usable in connection with an ordinary sheet rubber rolling mill, by means of which such rubber may be applied to the holland to any desired width with the operation of the mill, and the holland with the rubber thereon will then be automatically rolled up tight so that the exposed surface of the rubber on the holland is kept from exposure to the air until it is used. It may here be remarked that the roll of prepared material may then be transferred at any time to the machine of said co-pending application for transferring the rubber thereon to the liner while the holland is conserved and the latter may be again returned to this machine to again serve as a backing for a new supply of sheet rubber. In this manner the cost of the finished product is considerably reduced over what it is at present necessary to charge, on account of the fact that the cost of the holland is relatively high and when once used must be discarded.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved machine as provided with a supply roll of holland, but not in use.

Fig. 2 is a similar view showing a machine as engaged with a roll of the mill and the rubber being applied to the holland.

Fig. 3 is a top plan view of the machine in the condition shown in Fig. 1.

Referring now more particularly to the characters of reference on the drawings, the numeral 1 denotes a horizontal frame supported adjacent its forward end on wheels 2 and at its rear end by legs 3 so that it is in effect a portable truck and will be so considered. Standards 4 project upwardly from the truck adjacent the wheels, being connected at their lower ends by a transverse shaft 5 rigid therewith and journaled in brackets 6 on the frame 1.

Horizontal frame members 7 rigid with and extending lengthwise of the truck project from the upper ends of the standards 4, said members at their front end turnably supporting a permanently mounted roll 8. Disposed between the frame members 7 toward their rear end is a spool 9 releasably and frictionally engaged by end heads 10 and 11. The head 10 is mounted on a spindle 12 turnable in the adjacent frame 7 and incapable of axial movement. The hub of a sprocket wheel 13 is turnable on the spindle, the latter having friction collars 14 fixed thereon and engaging the hub, one collar being adjustable on the spindle so that the frictional contact may be varied. This device as will be obvious forms an adjustable friction slip clutch connection between the spindle and the sprocket wheel. A chain 15 about said sprocket wheel extends to and about another sprocket wheel 16, which is driven from the roll 8 in the opposite direction and at a relatively great speed by gearing 17.

The opposite head 11 is secured to a spindle 18 slidable and turnable in the adjacent member 7, with a spring 19 acting to force said head against the spool. Outwardly of the member 7 the spindle is connected to a throw out lever 20 by means of which the spindle may be moved axially and the head drawn away from the spool to permit removal of the latter. The outer end of the spindle 18 also preferably has a crank handle 21 thereon so that the spool may be turned by hand when necessary.

Disposed between the standards 4 toward the bottom is another spool 22, also removably supported by end heads 23. One head is movable axially and is controlled by a throw out lever 24 in the same manner as the head 11. The opposite head is controlled as to its freedom of rotation by a friction device 25 associated with its spindle 26 and adjusted by a hand wheel 27.

Swively mounted on the truck rearwardly of the standards is a compressed air cylinder 28 whose piston rod 29 is connected to the outer ends of arms 30 which extend to and are rigid with the shaft 5. A short air intake pipe 31 is connected to the bottom of the cylinder and is provided with a coupling member 32 adapted for connection with a flexible air hose 33.

In operation the roll of holland 34 to serve as the backing for the sheet rubber is initially mounted on the spool 22. Its free end is then passed over the front of the roll 8 and then wound on to the spool 9 by means of the crank 21 sufficiently to prevent slipping. The truck is then conveyed to a rubber rolling mill indicated generally at 35, the truck being tilted up at its further end so that upstanding pins 36 on the front end of the frames 1 will engage holes 37 provided for the purpose in the base frame 38 of the mill. This prevents backing away of the truck and will hold the same in a definite position relative to the mill. The air hose 33 is then coupled to the cylinder pipe 31 and air admitted to the cylinder so as to tilt the standards 4 forwardly and force the roll 8 into the same frictional engagement with the front roll 39 of the mill.

The sheeted rubber 40 which passes about the bottom of the roll 39 from the supply 41 in the mill is transferred onto the holland where the latter contacts with the roll, as shown in Fig. 2, since said holland is between the roll 8 and the mill roll 39. The spool 9 being driven by the rotation of the roll 8 (which rotates owing to its contact with the rotating mill roll to the sides of the holland) said holland, with the rubber disposed on its upper surface, is formed into a roll on the spool 9. Successive turns of the holland as the roll is formed thus cover the otherwise exposed surface of the rubber thereon and keep the latter from contact with the air indefinitely as is necessary.

When the supply roll 34 has been used up the air is exhausted from the cylinder so that the roll 8 will back away from the mill and the filled spool 9 is then removed for subsequent insertion in the other machine previously mentioned. The empty spool 22 is then removed and inserted in place of spool 9, since both said spools are interchangeable with each other. A fresh roll of holland on another spool, taken from the other machine after the rubber has been removed from the holland, may then be inserted in place of the spool 22 and the operations resumed and repeated.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A machine for backing sheet rubber with fabric comprising a spool for supporting a roll of fabric; a take up spool, and an intermediate roll over the forward face of which the fabric passes between the spools; said face of the roll being adapted for contact with a roll of a sheet-rubber forming mill whereby the rubber sheet as formed and passing about the roll with the operation of the mill will be transferred onto the adjacent face of the fabric.

2. A machine for backing sheet rubber with fabric comprising a spool for supporting a roll of fabric, a take-up spool, an intermediate roll adapted for frictional contact with a roll of a sheet-rubber mill, to be rotated thereby, the fabric passing over said intermediate roll between the spools, and means connecting said intermediate roll and the take-up spool in driving relation.

3. A machine for backing sheet rubber with fabric comprising a spool for supporting a roll of fabric, a take-up spool, an intermediate roll adapted for frictional contact with a roll of a sheet-rubber mill, drive means to be rotated thereby, the fabric passing over said intermediate roll between the spools to rotate the take up spool at a greater speed than said roll, and an adjustable slip clutch interposed in said driving means.

4. A machine for backing sheet rubber with fabric comprising a spool for supporting a roll of fabric, a take-up spool, an intermediate roll adapted for frictional contact with a roll of a sheet-rubber mill, to be rotated thereby, the fabric passing over said intermediate roll between the spools, and means to rotate the take up spool to wind the fabric and rubber thereon into the form of a tight roll.

5. A machine for backing sheet rubber with fabric comprising a spool for supporting a roll of fabric, a take-up spool, an intermediate roll adapted for frictional contact with a roll of a sheet-rubber mill, to be rotated thereby, the fabric passing over said intermediate roll between the spools, means to rotate the take-up spool to wind the fabric and rubber thereon, and means to adjustably brake the rotation of the supply spool.

6. A machine for backing sheet rubber with fabric comprising a spool for supporting a roll of fabric, a take-up spool, an intermediate roll adapted for frictional contact with a roll of a sheet-rubber mill, to be rotated thereby, the fabric passing over said intermediate roll between the spools, and means to rotate the take-up spool to wind the fabric and rubber thereon; said supply and take-up spools being removable and interchangeable.

7. A machine for backing sheet rubber with fabric comprising a spool for supporting a roll of fabric, a take-up spool, an intermediate roll over which the fabric passes between the spools, a frame on which said spools and roll are mounted, a base on which said frame is pivoted, and means between the base and frame for tilting the latter forwardly whereby the roll may be moved into pressing engagement with a roll of a sheet-rubber mill without tilting the base.

8. A device as in claim 7, in which the base is in the form of a portable truck.

9. A device as in claim 7, in which the base is formed as a wheeled truck, with means for releasably connecting the truck to the frame of the mill to prevent retractive movement of the truck when the frame is tilted forwardly.

10. A machine for backing sheet rubber with fabric comprising a spool for supporting a roll of fabric, a take-up spool, an intermediate roll over which the fabric passes between the spools, a frame on which said spools and roll are mounted, a base on which said frame is pivoted, a shaft rigid with the frame and journaled on the base, arms rigid with and projecting from the shaft, a compressed air cylinder pivoted at one end on the base, said cylinder having a piston rod pivotally connected to the arms, and an air pipe connected to the cylinder and adapted for detachable connection with an air hose.

11. A machine for backing sheet rubber with fabric comprising a fabric supporting spool, a take up spool, an intermediate roll over one face of which the fabric passes between the spools, and means mounting said roll so that said face may be brought into removable driving contact with a roll of a sheet-rubber forming mill.

12. A machine for backing sheet rubber with fabric comprising a fabric supporting spool, a take up spool, an intermediate roll and a portable supporting structure on which said spools and roll are mounted; the latter being adapted to be brought into driving contact along one side with a roll of a sheet-rubber forming mill, the fabric intermediate the spools passing between the rolls in engagement with said intermediate roll.

13. A machine for backing sheet rubber with fabric comprising a fabric supporting spool, a take up spool, an intermediate roll, a portable supporting frame on which said spools are directly mounted, and means mounting the roll on the frame in position for releasable driving contact with a roll of a sheet-rubber forming mill; the fabric intermediate the spools passing between the rolls in engagement with the intermediate roll.

HERBERT J. WOOCK.